US008827714B2

(12) United States Patent
Goforth et al.

(10) Patent No.: US 8,827,714 B2
(45) Date of Patent: Sep. 9, 2014

(54) WEB-BASED EMERGENCY RESPONSE EXERCISE MANAGEMENT SYSTEMS AND METHODS THEREOF

(75) Inventors: John W. Goforth, San Francisco, CA (US); Michael B. Mercer, Manteca, CA (US); Zach Heath, Livermore, CA (US); Lynn I. Yang, Oakland, CA (US)

(73) Assignees: Lawrence Livermore National Secuity, LLC., Livermore, CA (US); Sandia National Laboratories, Livermore, CA (US)

( * ) Notice: Subject to any disclaimer, the term of this patent is extended or adjusted under 35 U.S.C. 154(b) by 1155 days.

(21) Appl. No.: 12/488,806

(22) Filed: Jun. 22, 2009

(65) Prior Publication Data

US 2010/0323334 A1 Dec. 23, 2010

(51) Int. Cl.
*G09B 19/00* (2006.01)

(52) U.S. Cl.
USPC .......................................... 434/219; 434/226

(58) Field of Classification Search
USPC ............ 434/43, 218, 219, 223, 224, 239, 258
See application file for complete search history.

(56) References Cited

U.S. PATENT DOCUMENTS

| 3,293,777 | A | | 12/1966 | Shaw |
| 5,304,065 | A | * | 4/1994 | Hurst et al. .................... 434/218 |
| 5,767,777 | A | | 6/1998 | Whitehead |
| 5,815,417 | A | * | 9/1998 | Orr et al. ............................ 703/5 |
| 5,977,872 | A | * | 11/1999 | Guertin .......................... 340/515 |
| 7,044,742 | B2 | * | 5/2006 | Sumiya et al. ................ 434/305 |
| 7,552,017 | B1 | | 6/2009 | Baker et al. |
| 7,965,178 | B1 | * | 6/2011 | Schmuttor et al. ............ 340/506 |
| 2003/0125998 | A1 | * | 7/2003 | McKenney et al. ................ 705/7 |
| 2005/0001720 | A1 | * | 1/2005 | Mason et al. ............ 340/539.13 |
| 2005/0004789 | A1 | * | 1/2005 | Summers ......................... 703/22 |
| 2007/0044539 | A1 | * | 3/2007 | Sabol et al. .................. 73/19.01 |
| 2008/0062167 | A1 | * | 3/2008 | Boggs et al. .................. 345/419 |
| 2008/0241805 | A1 | | 10/2008 | Schantz |
| 2008/0294725 | A1 | * | 11/2008 | Kim et al. ..................... 709/205 |
| 2009/0263770 | A1 | * | 10/2009 | Ambrose ...................... 434/218 |
| 2009/0281850 | A1 | * | 11/2009 | Bruce et al. ....................... 705/7 |

OTHER PUBLICATIONS

Erickson, D. et al., "Integrated battlefield-effects research for the National Training Center. Appendix H. Designs of nuclear and chemical field simulators for the National Training Center," Technical report, Jun. 13, 1983-Dec. 30, 1984, pp. 1-82.

Schmidtborn, I., "Emergency drills with or without a simulator?" Atw-lnternationale Zeitschrift Fur Kernenergie 43 (6), 1998, pp. 389-390 (untranslated).

(Continued)

*Primary Examiner* — Robert J Utama
*Assistant Examiner* — Sadaruz Zaman
(74) *Attorney, Agent, or Firm* — Dominic M. Kotab (57) ABSTRACT

According to one embodiment, a method for simulating portions of an emergency response exercise includes generating situational awareness outputs associated with a simulated emergency and sending the situational awareness outputs to a plurality of output devices. Also, the method includes outputting to a user device a plurality of decisions associated with the situational awareness outputs at a decision point, receiving a selection of one of the decisions from the user device, generating new situational awareness outputs based on the selected decision, and repeating the sending, outputting and receiving steps based on the new situational awareness outputs. Other methods, systems, and computer program products are included according to other embodiments of the invention.

24 Claims, 3 Drawing Sheets

(56) References Cited

OTHER PUBLICATIONS

Persson et al., "Using a Sensor Source Intelligence Cell to Connect and Distribute Visual Information from a Commercial Game Engine in a Disaster Management Exercise," 2007 IEEE, Instrumentation and Measurement Technology Conference—IMTC 2007, May 1-3, 2007, pp. 1-5.

Comte et al., "Scenarisation des mesures dans l'environnement pour un exercice national de crise : l'example de l'exercise de Saclay du Sep. 17, 2009," EDP Sciences, 2010, Radioprotection 2010, vol. 45, No. 3, pp. 291-305.

Wagner et al., "Radiological Disaster Simulators for Field and Aerial Measurements," 2002, pp. 1-10.

Webster et al., "Software as a Service Approach to Sensor Simulation Software Deployment," 2012 SPIE, Proceedings of SPIE, vol. 8403, pp. 84030I-1/84030I-9.

* cited by examiner

FIG. 3

WEB-BASED EMERGENCY RESPONSE EXERCISE MANAGEMENT SYSTEMS AND METHODS THEREOF

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to emergency preparedness, and more particularly to systems and methods for web-based emergency response exercise management.

BACKGROUND

Emergency response solutions currently in use generally are not connected to the ground-truth simulations, and generally provide more of a Master Scenario Event List (MSEL) checklist functionality than a decision path road-map. Currently used military solutions include various software tools that are loosely connected to simulations but do not provide exercise roadmap, scenario design, and/or full simulation integration. The military's target customer is not the first responder community, and the tools are not easy-to-use (e.g., none of the tools employed use a carousel/spotlight method). The official military tool is Joint Master Scenario Event List (JMSEL) which is supported by the United States Joint Forces Command (JFCOM). There is also a tool named JMECS used in joint Live Virtual Constructive (GLVC) exercises. The Army also uses a tool called ISM. However, none of these tools are user friendly or designed for use by first responders.

Generally, first-responders, those who are first to the scene of an incident or emergency, as well as their trainers, do not train well on computers. This is because first responders typically do not use computers in their response activities. Therefore, there is a need for a simulation environment that is run on a computer that includes as much real-time environmental challenges as possible, thereby challenging the trainee in more of a real-life basis.

Therefore, in order to help train first-responders, it would be desirable to have an emergency response solution which not only accurately simulates real-life crises in a dynamic way, but also includes a user interface that is designed for use by first-responders, and those training and/or evaluating the training of first-responders.

SUMMARY

According to one embodiment, a method for simulating portions of an emergency response exercise includes generating situational awareness outputs associated with a simulated emergency and sending the situational awareness outputs to a plurality of output devices. Also, the method includes outputting to a user device a plurality of decisions associated with the situational awareness outputs at a decision point, receiving a selection of one of the decisions from the user device, generating new situational awareness outputs based on the selected decision, and repeating the sending, outputting and receiving steps based on the new situational awareness outputs.

A computer program product embodied on a computer readable medium, according to another embodiment, includes computer code for generating situational awareness outputs associated with a simulated emergency, for sending the situational awareness outputs to a plurality of output devices, and for outputting a plurality of decisions at a decision point to a user device. The decisions are associated with the situational awareness outputs. The computer program product also includes computer code for receiving a selection of one of the decisions from the user device, for generating new situational awareness outputs based on the selected decision, and for repeating the sending, outputting and receiving steps based on the new situational awareness outputs.

In another embodiment, a system for simulating portions of an emergency response exercise includes a central server for generating situational awareness outputs associated with a simulated emergency, a plurality of output devices receiving and outputting the situational awareness outputs, and a user device for outputting a plurality of decisions at a decision point. The decisions are associated with the situational awareness outputs, and the central server receives a selection of one of the decisions from the user device. Also, the central server generates new situational awareness outputs based on the selected decision, and the central server repeats the sending, outputting and receiving based on the new situational awareness outputs.

Also included in the invention, according to one embodiment, is a method for planning an emergency response exercise. The method includes creating inputs, creating decision points, and creating outputs for each decision. The inputs include situational awareness outputs associated with a simulated emergency and decisions that can be made upon becoming apprised of the situational awareness outputs. Each decision point has a plurality of the decisions, and the outputs affect which decision point is shown after the associated decision is selected.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Various embodiments of the present invention have the potential to provide a network-based application and its unique graphical user interface (GUI), e.g., a webpage, for use in planning, execution, and analysis of training exercises for emergency management. The application typically may be connected to computer simulations (SIMs) which form the 'ground-truth' (the consequences of the trainees' (users') decisions.) For exercise planning, the application may serve as a shared workspace for scenario designers and evaluators allowing development of injects, decision points, and objectives, among other functionality that may be included in the application. For exercise execution, the application may serve as a live exercise road-map including up-to-date decisions made by the trainees. For post-exercise analysis, the application captures all data so it can be used in after-action-review. Note that for simplicity, much of the following description refers to functionality of and inputs to the GUI. It should be understood that such functionality, inputs, etc., may also apply to the underlying application itself, exclusive of the GUI. Moreover, while much of the description centers around a web-based implementation, any network may be used.

The GUI, in some approaches, is intended for use by those people supporting the trainees—not for use by the trainees themselves. The people which support the trainees are not always technically-savvy persons, so the more user-friendly the GUI is, the more successful the emergency exercise management is. The novel GUI, according to some embodiments, employs a Carousel/Spotlight method, making it very easy to use and provides access to a tremendous amount of data, while only taking up the bottom half of a small laptop screen, allowing other programs to be seen and controlled while running the exercise. Also, this leaves the top half of the screen for alert messages and streaming video.

According to some preferred embodiments, the GUI is built to work well with tablet personal computers (PCs) (which generally include touch screen capability), so that the evaluators can stand while working and taking notes.

In one general embodiment, a method for simulating portions of an emergency response exercise includes generating situational awareness outputs associated with a simulated emergency, sending the situational awareness outputs to a plurality of output devices, and outputting a plurality of decisions at a decision point to a user device, the decisions being associated with the situational awareness outputs. The method also includes receiving a selection of one of the decisions from the user device, generating new situational awareness outputs based on the selected decision, and repeating the sending, outputting and receiving steps based on the new situational awareness outputs.

In another general embodiment, a computer program product embodied on a computer readable medium comprises computer code for generating situational awareness outputs associated with a simulated emergency and for sending the situational awareness outputs to a plurality of output devices. The computer readable medium also comprises computer code for outputting a plurality of decisions at a decision point to a user device, the decisions being associated with the situational awareness outputs, and for receiving a selection of one of the decisions from the user device. In addition, the computer readable medium comprises computer code for generating new situational awareness outputs based on the selected decision, and for repeating the sending, outputting and receiving steps based on the new situational awareness outputs.

In yet another general embodiment, a system for simulating portions of an emergency response exercise includes a central server for generating situational awareness outputs associated with a simulated emergency, a plurality of output devices receiving and outputting the situational awareness outputs, and a user device for outputting a plurality of decisions at a decision point, the decisions being associated with the situational awareness outputs. The central server receives a selection of one of the decisions from the user device, generates new situational awareness outputs based on the selected decision, and repeats the sending, outputting and receiving based on the new situational awareness outputs.

In another general embodiment, a method for planning an emergency response exercise comprises creating inputs, the inputs including situational awareness outputs associated with a simulated emergency and decisions that can be made upon becoming apprised of the situational awareness outputs. The method also includes creating decision points, each decision point having a plurality of the decisions, and creating outputs for each decision, the outputs affecting which decision point is shown after the associated decision is selected.

For ease of understanding, the description of the invention, according to several embodiments, is split into sections. Each section is described separately, but of course, the choice of sections with which to split the descriptions has no bearing on the invention whatsoever, and is not limiting in any way.

Exercise Road-Map

The best emergency exercises are fully planned out to include every conceivable and possible decision path. The exercise road-map capability allows scenario developers to plan the exercise to this detail. According to some embodiments, during the execution of the exercise, the support staff may select the decisions as they are made at decision points. Trainees also may make unanticipated decisions, which may be added dynamically, on the fly. All instances of the GUI are automatically updated frequently, such as once per time period (5 seconds, 30 seconds, 1 minute, 5 minutes, etc.), after each input/output, when conditions change, etc., so there is a single operational picture. If a decision is marked on one instance of the GUI, it is immediately reflected in all other instances, according to preferred embodiments. The exercise road-map also allows for hiding decisions that are not yet applicable, through the use of full simulation integration, in some approaches.

Full Simulation Integration

The application and GUI may be connected to entity-level simulations (SIMs) which form the 'ground-truth' (the realism and consequences to the trainees' decisions) according to some approaches. Entity-level simulations model the resources available down to the individual (e.g., firefighter, fire truck, police officer, etc.) The SIMs may execute in real-time along with the exercise (the simulation may be synchronized with a clock). This allows trainee's decisions to affect ground-truth, according to preferred embodiments. Through full simulation integration, the GUI can receive 'Sim-Events' and send 'Sim-Requests.' A 'Sim-Event' is something that happened in the ground-truth of the SIMs, typically an incident (e.g., a bomb exploded in a crowded stadium). A 'Sim-Request' is generated from a decision that has been made (e.g., evacuate the stadium). Sim-Events are automatically generated by the SIMs and Sim-Requests are automatically fulfilled by the SIMs, according to some approaches.

Inputs and Outputs of a Decision Point

A decision point has inputs, outputs, and/or choices (potential decisions of trainees and others). The inputs may identify the state of the decision point. They are made up of Sim-Events and pre-requisite decisions, among other events and items of data and information. The outputs may be Sim-Requests, which are triggered by the selection of a decision choice in some approaches. For example, a decision point by the name of "effectively deal with the stadium bomb," would have a Sim-Event input that would be "bomb explodes in stadium." This Sim-Event alerts the GUI that the event has happened, thereby allowing the GUI to hide the decision from the main view until it actually happens, since the decision is probably not relevant, as it cannot be made until the event happens.

The other input, prerequisite decisions, are not required to make decisions, but are used in evaluating the trainee's decision. For example, if the choices for "effectively deal with the stadium bomb" are "evacuate stadium" and "do not evacuate stadium," the pre-requisite decision might be "organize crowd control in the parking lots to prepare for evacuation of the stadium." This pre-requisite is not required for making the decision, but it is related to making the decision.

A decision output is simply an automated way to inform the SIMs to reflect the choice made by the trainee. For example, if the choice is made to "evacuate the stadium," a request is made to the SIMs to begin evacuating the stadium. All the consequences received back from the SIMs in the future will reflect that decision.

Labels

Generic labels can be applied to decision points and choices in some embodiments. Examples of types of Decision Point Labels are: role (e.g., Incident Commander), location of incident (e.g., stadium), objective (e.g., keep the public informed), and category (e.g., resource order). Examples of Choice Labels are: preferred choice, poor choice, etc. A single decision point or choice can have zero or more labels, according to some approaches.

Filtering

Decision Point Labels are used primarily by the filtering system. A user can create 'Filtering Tabs' (see FIG. 1) which may filter out decision points from the GUI based on one or more Decision Point Labels. One or more Filtering Tabs can be assigned as a 'View.' This allows the user to build multiple Views, in some approaches, each with a different set of Filtering Tabs. For example, the user could build a View for each trainee role, with each view containing location-based tabs for that role. Filters can also be setup, according to some approaches, based on 'State-Based Decision Point Labels.' These are labels that may be automatically assigned to a Decision Point based on its inherent status (e.g., 'Waiting for Sim-Event,' 'Ready,' 'Done—decision made,' etc.).

Auto-Run

Choice Labels may create the ability to make trainee decisions when that trainee role is simulated, in some embodiments. A single trainee may rely heavily on decisions that are made by other trainees. However, it is sometimes not possible to fill every single role in a training exercise, and some roles may be simulated and played-out as 'Virtual Trainees.' This is what the Auto-Run mode achieves, according to some embodiments.

In Auto-Run mode, once a decision point has received all relevant Sim-Event inputs, the choice labeled with 'Preferred Choice' is automatically made, and thus in turn, automatically dispatches a Sim-Request to execute that decision, according to some approaches. Sometimes, entire teams must be simulated. For example, if the Emergency Operations Center (EOC) team is the live trainees, the entire Incident Management Team (IMT) could be simulated, where each simulated role is playing off one another. In fact, with a rich enough set of road-maps (decision paths), including one for every role, the entire training exercise could be simulated— with few or no live trainees at all. This, of course, is not a preferred method of executing the simulation, as the goal of running the simulation is to help train the trainees in proper emergency event management. However, this opens up the ability to do single-person functional exercise training, something that has never been possible before, according to the review of currently used emergency response solutions and systems. Choice Labels also create the ability for the exercise to be fast-forwarded (the rate of time passage in the scenario may be increased), in some approaches. When fast-forwarding an exercise, decisions still need to be made during that time; thus, simulating the trainee decisions for a role may be required in order to fast-forward an exercise. The Auto-Run Choice Label selection can be modified as a user setting in some embodiments (perhaps the desire is to choose mediocre or poor choices, for example).

GUI—Carousel/Spotlight

Figure 1:
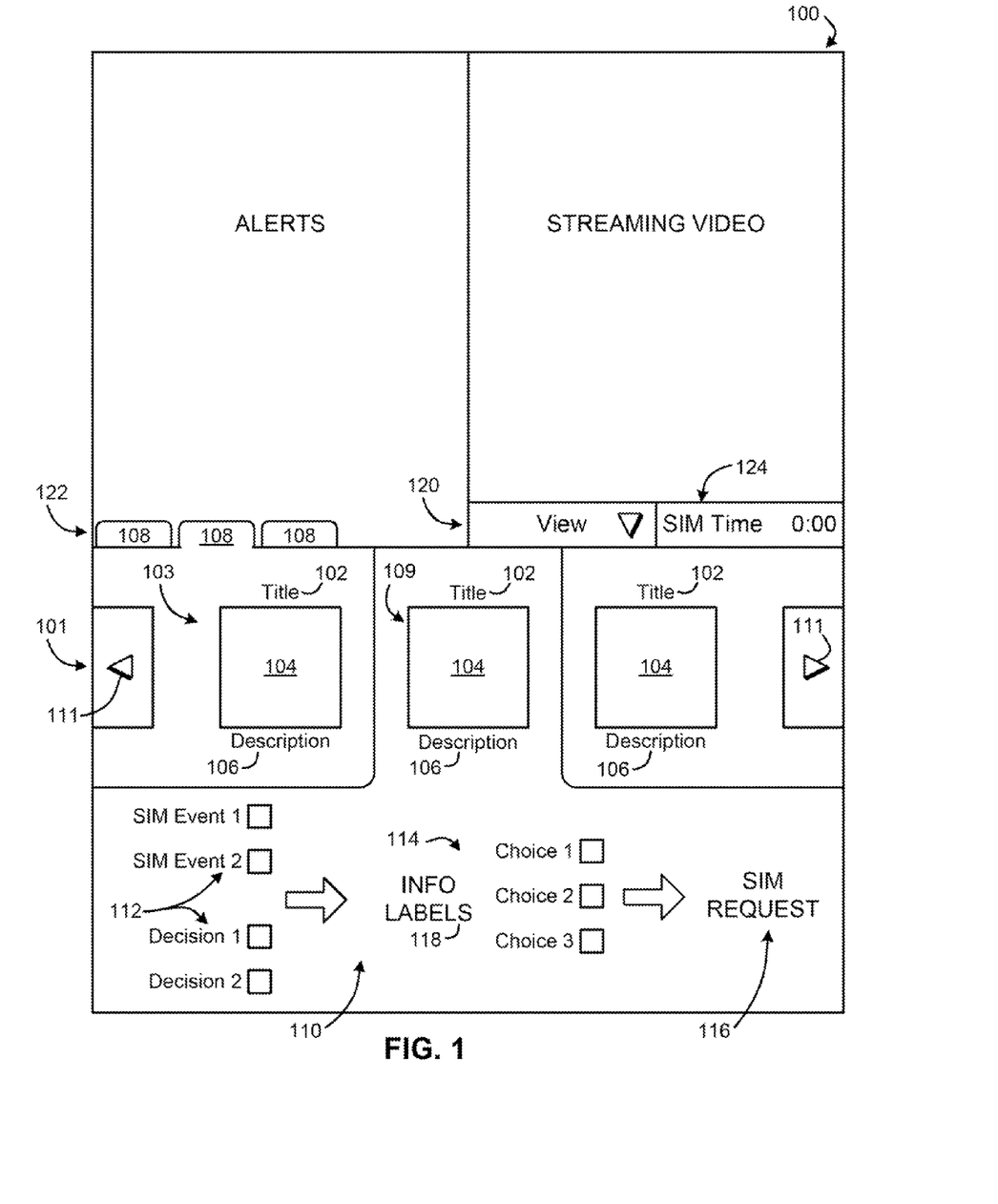
FIG. 1 is a schematic diagram of a graphical user interface according to one embodiment.

Now referring to FIG. 1, in the bottom half of FIG. 1, a GUI 100 is shown according to one embodiment. In addition, the Carousel/Spotlight method is shown on the GUI 100. The first of the two rows is the Carousel 101 populated with Decision Point items 103. Each item is a Decision Point 'preview' containing a title 102, image 104, and short description 106. The items 103 that are shown in the Carousel 101 may be filtered by the selected Filtering Tab 108. The background colors of each individual item 103 may change based on its State-Based Decision Point Label, according to some embodiments. Of course, any other feature may be used to distinguish between the State-Based Decision Point Labels, such as text, size, position, shading, etc. The Carousel 101 may be advanced by the user clicking on the arrow buttons 111 at the far left and far right of the screen, by scrolling with a user input device, such as a mouse, touchpad, by using arrow keys on a keyboard, etc.

The center of the Carousel 101 shows the selected item 109. Of course, the selected item 109 could be shown anywhere in the GUI, such as upper-right-corner position, upper-left-corner position, etc. The selected item 109 may be shown in full detail in the Spotlight Selection Details section 110, shown as the second of the two rows (the bottom-most row). The Spotlight Selection Details section 110 includes the inputs on the left 112, the decision point information and choices 114 in the middle, and the outputs on the right 116. The decision point information contains the decision name 102, description 106, applicable Decision Point Labels 118 and a place for entering notes (not shown, may be a pop-up window in some approaches). The choices display applicable choice labels according to some embodiments. All instances of the GUI 100 may keep the current states of the inputs, choices and outputs up-to-date. For example, when a decision is made and a choice selected, all instances of the GUI 100 may reflect the choice.

The Navigation Bar 122 (at the top of the Carousel/Spotlight section) may include Filtering Tabs 108, a View selection pull-down menu 120, and the current exercise SIM time 124. Not pictured in FIG. 1, but included in the design of the GUI according to some embodiments, is a place for entering notes, and the ability to add custom decisions on the fly.

The upper portion of the GUI 100 is split into two sections. The section on the left may be reserved for alerts 126, that may be used to alert the user as to current situations, new alarm conditions, past alarm conditions that have not been addressed, etc. The section on the right may be used for streaming video 128, and this video may include news feeds, current closed circuit TV feeds, etc., so that the user may monitor the progress of the emergency situation.

Of course, this GUI 100 is used only as an example of what a GUI may look like, and is not meant to limiting in any way.

A Note on Implementation

The term 'GUI' as used in this document refers to the functionality apparent to the user. For example, the actual implementation of the 'GUI' may typically include a back-end web server, back-end database, and front-end client web application. The SIMs may be connected to the back-end. The front-end client may interact only with the web server. Data may be transferred asynchronously between the front-end client web application and the back-end web server. This data may be kept up-to-date on all front-end web clients. Other implementations are possible also, of course, and the invention is not meant to be limited by this brief discussion of a GUI implementation according to one embodiment.

Figure 2:
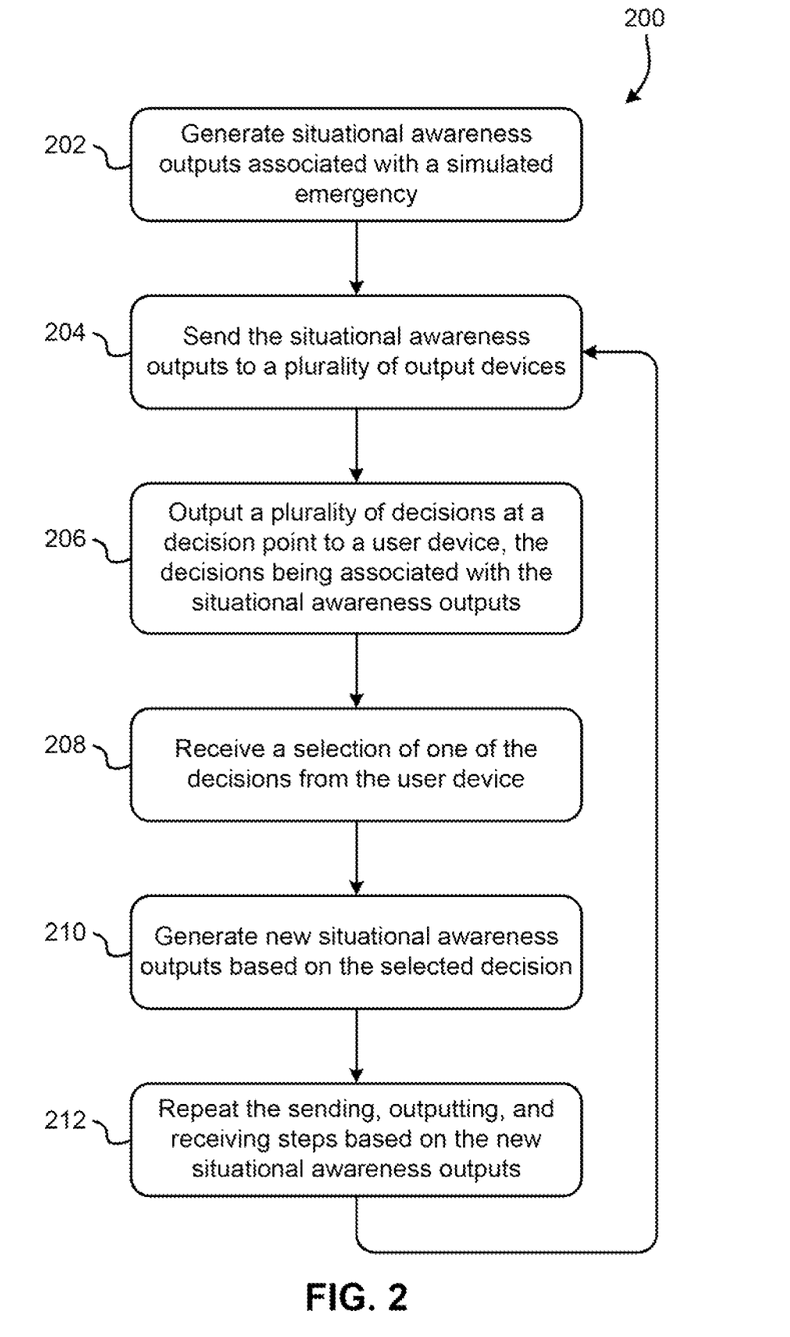
FIG. 2 is a flowchart of a method according to one embodiment.

Now referring to FIG. 2, a method 200 for simulating portions of an emergency response exercise according to one embodiment. The method may be executed in any environment, and may be included in a system and/or a computer program product, according to some more embodiments.

In operation 202, situational awareness outputs are generated that are associated with a simulated emergency. The simulated emergency may be a simulation of any type of emergency, such as a bomb threat, a fire, a terrorist attack, a chemical spill, etc. The situational awareness outputs may be responses to inputs from a user, may be tailored for each specific type of emergency simulated, may be included in a GUI produced to a user, etc. In addition, the association between the situational awareness output and the emergency may be by type of emergency, such as reports from a fire department for fires, communications from a police department in the case of a bomb threat, requests for action from a power plant in situations where a meltdown are possible, etc.

For example, if an emergency situation is a fire at a school, and a user chooses to evacuate the school, the situational awareness output may be a video produced on a GUI viewed by the user which shows exits of the school blocked by fire damage, which may then require further input from the user.

In some approaches, the situational awareness outputs may include simulated decisions of necessary parties. For example, if a fire department is called to respond to a fire, a situational awareness output may include a message from the fire department indicating that a truck has been sent to the scene of the fire.

In operation 204, the situational awareness outputs are sent to a plurality of output devices. For example, the situational awareness outputs may be sent to a plurality of display devices in the form of a GUI, possibly similar to that shown in FIG. 1. In another example, the situational awareness outputs may be sent to a plurality of speakers, such as a telephone call from a first responder output on a loud speaker, orders from an on-site emergency responder, etc. In yet another example, a video clip may be shown to users on one or more display devices, the video clip depicting a scene of an emergency, a news report about the emergency, a first responder on a teleconference call, etc.

In operation 206, a plurality of decisions at a decision point are output to a user device, the decisions being associated with the situational awareness outputs. In one approach, for each situational awareness output, a user may respond to the situational awareness output by choosing from a list, including a plurality of decisions at a decision point.

In some approaches, the user device may be a handheld device having a touchscreen, such as an Apple iPhone®, Blackberry® device, Palm® device, etc. Of course, the plurality of decisions output to a user device may be output in a GUI similar to that shown in FIG. 1.

In some embodiments, the selectable decisions may be output on a GUI along with a representation of at least some of the associated situational awareness outputs and a previously-selected decision. In one embodiment, the GUI is similar to that shown in FIG. 1.

In one example, an emergency situation may be a bomb threat at a power plant, and a decision point may be whether to evacuate a neighboring village or to perform some other task. In this example, a plurality of decisions may include: a) evacuate the village as quickly as possible, b) prepare an emergency assessment plan before sending evacuation orders to the village, c) send the bomb squad to power plant, d) restrict the power plant area from reporters to contain the story and prevent widespread panic.

In some approaches, the output devices may be near trainees taking part in the emergency response exercise. For example, tablet PCs may be placed near the trainees taking part in the emergency response exercise, such that the trainees may input their selections and decisions based on outputs to the output devices.

In operation 208, a selection of one of the decisions is received from the user device. The user may indicate this selection, or the selection may be automatically made based on one or more factors, such as in an automatic mode. Also, in some embodiments, the user may indicate this selection from a tablet PC through a GUI such as that shown in FIG. 1.

In some approaches, the selected decisions may be logged on a physical data storage medium. The logged decisions may be indexed and/or searchable, and may be displayable in a spreadsheet, GUI, database, etc. In addition, the logged decisions may be reviewable so that the entire scenario may be replayed at a later time to critique and/or commend the decisions made by a trainee during the course of the emergency response exercise.

According to some embodiments, a decision may be received that is not one of the plurality of decisions. For example, the user may type in a series of commands that are understood by the emergency response exercise, such as "put out fire." In the cases where a non-standard decision is received, new situational awareness outputs may be generated based on the received decision, and the sending, outputting, and receiving steps may be repeated based on the new situational awareness outputs. In this fashion, the emergency response exercise may adapt to decisions that are not previously known, thereby enabling a more robust and unpredictable training simulation.

In operation 210, new situational awareness outputs are generated based on the selected decision. For example, if the user selected option d from above, new situational awareness outputs may include "power plant explodes," "story is leaked by power plant worker," "bomb squad is caught in traffic," etc. Of course, situational awareness outputs will follow logically from the selection of the user, or may introduce a new interrupt situation that the user is asked to address.

In operation 212, the sending, outputting, and receiving steps are repeated based on the new situational awareness outputs. In this fashion, the method 200 may continue until the emergency situation is resolved, the user responds in too many incorrect or damaging ways, or the simulated portion of the emergency response exercise ends.

In some approaches, which decision point is output during the repeating depends upon at least one previously-selected decision. For example, if a previously selected decision is "evacuate village," the decision point output during the repeated sending will not be "do you want to evacuate the village," since this decision has already been made. In this fashion, only logical decision points may be conveyed to the user.

According to some embodiments, the methods presented above may be included in a computer program product. A computer program product embodied on a computer readable medium may comprise computer code for generating situational awareness outputs associated with a simulated emergency, and for sending the situational awareness outputs to a plurality of output devices. Also, the computer readable medium may comprise computer code for outputting a plurality of decisions at a decision point to a user device, the decisions being associated with the situational awareness outputs and for receiving a selection of one of the decisions from the user device. In addition, the computer readable medium may comprise computer code for generating new situational awareness outputs based on the selected decision, and for repeating the sending, outputting and receiving steps based on the new situational awareness outputs.

According to some preferred embodiments, all clocks are synchronized, across the virtual and real world activities, thereby ensuring that each decision is made by the trainees in real-time.

In addition, any of the above mentioned embodiments associated with the methods presented above may be reflected in the computer program product, such as possibly including computer code for logging the selected decisions on a physical data storage medium, including a user device that may be a handheld device having a touchscreen, and possibly having a computer program product which may be operable such that which decision point is output during the repeating depends upon the previously-selected decision. Of course, these embodiments are presented by way of example only, and are not meant to limit the functionality of the computer program product, which is only limited by the claims included herewith.

In some more embodiments, a system for simulating portions of an emergency response exercise may include some or all of the methods described above. In one embodiment, the system comprises a central server for generating situational awareness outputs associated with a simulated emergency, a plurality of output devices receiving and outputting the situational awareness outputs, and a user device for outputting a plurality of decisions at a decision point, the decisions being associated with the situational awareness outputs. The central server receives a selection of one of the decisions from the user device. Also, the central server generates new situational awareness outputs based on the selected decision, and repeats the sending, outputting and receiving based on the new situational awareness outputs.

According to some approaches of the system, some or all of the embodiments of the methods discussed above may be included in the system. For example, the system may further comprise a data storage medium upon which the selected decisions are written for logging thereof. In more embodiments, the system may be operable such that the situational awareness outputs include simulated decisions of necessary parties. In more embodiments, the system may be operable such that the selectable decisions are output on a graphical user interface along with a representation of at least some of the associated situational awareness outputs and a previously-selected decision.

According to more embodiments, the central server may receive a decision that is not one of the plurality of decisions, and may generate new situational awareness outputs based on the received decision, and may repeat the sending, outputting and receiving based on the new situational awareness outputs.

In more approaches, the output devices may be near trainees taking part in the emergency response exercise. In some approaches, the user device may be a handheld device having a touchscreen.

Also, in some approaches, the system may be operable such that which decision point is output during the repeating depends upon the previously-selected decision.

Figure 3:
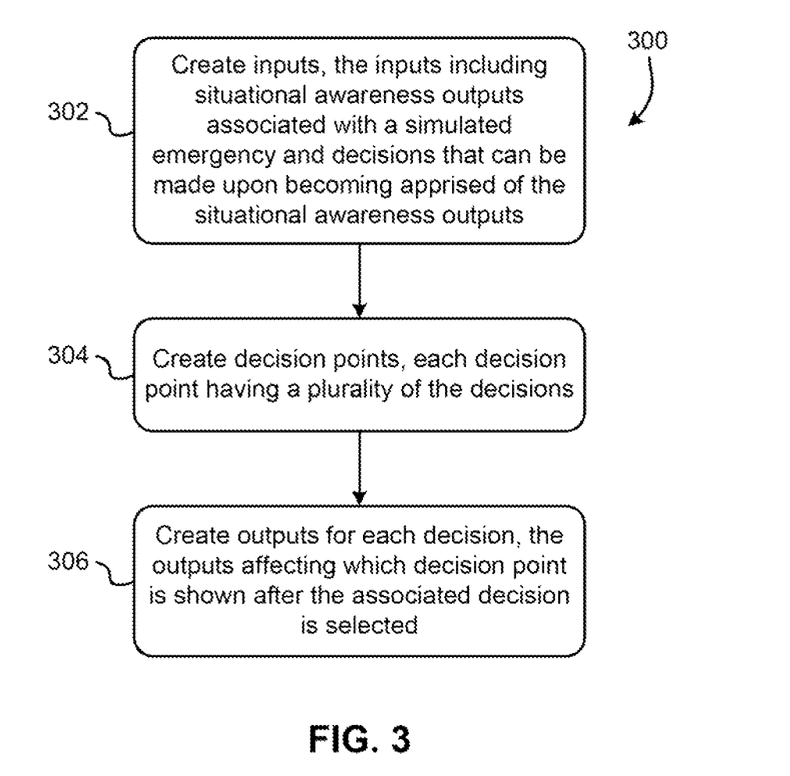
FIG. 3 is a flowchart of a method according to one embodiment.

Now referring to FIG. 3, a method 300 is shown for planning an emergency response exercise according to one embodiment. The method 300 may be executed in any environment, and may be included in a system and/or a computer program product, according to some more embodiments.

In operation 302, inputs are created, the inputs including situational awareness outputs associated with a simulated emergency and decisions that can be made upon becoming apprised of the situational awareness outputs.

In operation 304, decision points are created, each decision point having a plurality of the decisions.

In operation 306, outputs are created for each decision, the outputs affecting which decision point is shown after the associated decision is selected.

Of course, any of the various embodiments described in relation to method 200 in FIG. 2 may be included in method 300, where it makes a logical connection.

The invention in any of the before-mentioned embodiments, as well as in other, not described embodiments, may be useful for a number of applications. For example, local, state, and federal entities are regularly involved in emergency management training exercises. Preparation and execution of a single exercise can cost millions of dollars. By using the systems, methods, and/or computer program product disclosed herein enables these exercises to be executed for less money and more efficiently, thereby freeing up resources for other activities.

Other uses include allowing private industry government contractors, which in many cases aid in many or all aspects of the local, state, and federal exercises for the various governmental entities, to use the tool, in any of the various embodiments disclosed herein, to execute the emergency management exercises. For example, several of California's yearly state-wide Golden Guardian emergency exercises have been coordinated by the EG&G Division of URS Corp. (a private contractor).

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application specific integrated circuits, programmable logic devices, or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer code thereon for use by a computer, including optical media such as read only and writeable CD and DVD, magnetic memory, semiconductor memory (e.g., FLASH memory and other portable memory cards, etc.), etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for simulating portions of an emergency response exercise, the method comprising:
    generating situational awareness outputs associated with a simulated emergency;
    sending the situational awareness outputs to a plurality of output devices;
    outputting a plurality of decisions at a decision point to a user device, the decisions being associated with the situational awareness outputs;
    receiving a selection of one of the decisions from the user device;
    generating new situational awareness outputs based on the selected decision; and
    repeating the sending, outputting and receiving steps based on the new situational awareness outputs.

2. The method of claim 1, further comprising logging the selected decisions on a physical data storage medium, wherein the situational awareness outputs are associated with the simulated emergency by type of emergency.

3. The method of claim 1, wherein the situational awareness outputs include simulated decisions of necessary parties, wherein at least one of the situational awareness outputs comprises one or more of an audio message and a video message.

4. The method of claim 1, further comprising receiving a decision that is not one of the plurality of decisions, generating new situational awareness outputs based on the received decision, and repeating the sending, outputting and receiving steps based on the new situational awareness outputs, wherein the decision that is not one of the plurality of decisions is a user-defined decision.

5. The method of claim 1, wherein the decisions are made by one or more trainees, and wherein the output devices are near the one or more trainees taking part in the emergency response exercise.

6. The method of claim 1, wherein the user device is a handheld device having a touchscreen, and further comprising filtering one or more of the decision points.

7. The method of claim 1, further comprising:
    logging the selected decisions on a physical data storage medium,
    filtering one or more of the decision points;
    receiving a decision that is not one of the plurality of decisions,
    generating new situational awareness outputs based on the received decision, and
    repeating the sending, outputting and receiving steps based on the new situational awareness outputs,
    wherein the decision that is not one of the plurality of decisions is a user-defined decision,
    wherein the situational awareness outputs are associated with the simulated emergency by type of emergency
    where the decisions are made by one or more trainees,
    wherein the output devices are near the one or more trainees taking part in the emergency response exercise, and
    wherein which decision point is output during the repeating depends upon the previously-selected decision.

8. A non-transitory computer program product embodied on a computer readable medium, comprising:
    computer code for generating situational awareness outputs associated with a simulated emergency;
    computer code for sending the situational awareness outputs to a plurality of output devices;
    computer code for outputting a plurality of decisions at a decision point to a user device, the decisions being associated with the situational awareness outputs;
    computer code for receiving a selection of one of the decisions from the user device;
    computer code for generating new situational awareness outputs based on the selected decision; and
    computer code for repeating the sending, outputting and receiving steps based on the new situational awareness outputs.

9. The computer program product of claim 8, further comprising computer code for logging the selected decisions on a physical data storage medium; and
    computer code for simulating at least one of the decisions at least one of the decision points.

10. The computer program product of claim 8, wherein the computer program product is operable such that the situational awareness outputs include simulated decisions of necessary parties.

11. The computer program product of claim 8, further comprising computer code for receiving a decision that is not one of the plurality of decisions, computer code for generating new situational awareness outputs based on the received decision, and computer code for initiating activation of the computer code for sending, outputting and receiving using the new situational awareness outputs.

12. The computer program product of claim 8, wherein the user device is a handheld device having a touchscreen, and
    wherein the computer code for repeating the sending, outputting and receiving steps based on the new situational awareness outputs performs the repeating the sending, outputting and receiving steps based on a set of roadmaps.

13. The computer program product of claim 8, wherein the computer program product is operable such that the selectable decisions are output on a graphical user interface along with a representation of at least some of the associated situational awareness outputs and a previously-selected decision.

14. The computer program product of claim 8, further comprising:
    computer code for logging the selected decisions on a physical data storage medium;
    computer code for simulating at least one of the decisions at at least one of the decision points;
    computer code for receiving a decision that is not one of the plurality of decisions;

computer code for generating new situational awareness outputs based on the received decision; and computer code for initiating activation of the computer code for sending, outputting and receiving using the new situational awareness outputs, wherein the computer program product is operable such that the situational awareness outputs include simulated decisions of necessary parties, wherein the computer program product is operable such that the selectable decisions are output on a graphical user interface along with a representation of at least some of the associated situational awareness outputs and a previously-selected decision, wherein the user device is a handheld device having a touchscreen, wherein the computer code for repeating the sending, outputting and receiving steps based on the new situational awareness outputs performs the repeating the sending, outputting and receiving steps based on a set of road-maps, and wherein the computer program product is operable such that which decision point is output during the repeating depends upon the previously-selected decision.

15. A system for simulating portions of an emergency response exercise, the system comprising:
a central server for generating situational awareness outputs associated with a simulate emergency;
a plurality of output devices receiving and outputting the situational awareness outputs; and
a user device for outputting a plurality of decisions at a decision point, the decisions being associated with the situational awareness outputs;
wherein the central server receives a selection of one of the decisions from the user device;
wherein the central server generates new situational awareness outputs based on the selected decision;
wherein the central server repeats the sending, outputting and receiving based on the new situational awareness outputs.

16. The system of claim 15, further comprising a data storage medium upon which the selected decisions are written for logging thereof, and logic for applying one or more labels to one or more of the decision points.

17. The system of claim 15, wherein the system is operable such that the situational awareness outputs include simulated decisions of necessary parties.

18. The system of claim 15, wherein the central server receives a decision that is not one of the plurality of decisions, and generates new situational awareness outputs based on the received decision, and repeats the sending, outputting and receiving based on the new situational awareness outputs.

19. The system of claim 15, wherein the output devices are near trainees taking part in the emergency response exercise, and
wherein the user device is a handheld device having a touchscreen.

20. The system of claim 15, wherein each decision point comprises:
one or more inputs;
one or more outputs; and
one or more choices,
wherein the inputs comprise one or more of simulated events (Sim-Events) and pre-requisite decisions,
wherein the outputs comprise one or more of simulated requests (Sim-Requests), and
wherein the choices correspond to a decision outcome.

21. The system of claim 15, wherein the system is operable such that the selectable decisions are output on a graphical user interface along with a representation of at least some of the associated situational awareness outputs and a previously-selected decision.

22. The system of claim 15, further comprising: a data storage medium upon which the selected decisions are written for logging thereof, and logic for applying one or more labels to one or more of the decision points,
wherein each decision point comprises:
one or more inputs;
one or more outputs; and
one or more choices,
wherein the inputs comprise one or more of simulated events (Sim-Events) and pre-requisite decisions,
wherein the outputs comprise one or more of simulated requests (Sim-Requests), and
wherein the choices correspond to a decision outcome,
wherein the system is operable such that the situational awareness outputs include simulated decisions of necessary parties,
wherein the central server receives a decision that is not one of the plurality of decisions, and generates new situational awareness outputs based on the received decision, and repeats the sending, outputting and receiving based on the new situational awareness outputs,
wherein the system is operable such that the selectable decisions are output on a graphical user interface aloe along with a representation of at least some of the associated situational awareness outputs and a previously-selected decision,
wherein the output devices are near trainees taking part in the emergency response exercise,
wherein the user device is a handheld device having touchscreen, and
wherein the system is operable such that which decision point is output during the repeating depends upon the previously-selected decision.

23. A method for planning an emergency response exercise, the method comprising:
generating a simulated emergency on a server;
creating inputs, the inputs including situational awareness outputs associated with the simulated emergency and decisions that can be made upon becoming apprised of the situational awareness outputs;
creating decision points, each decision point having a plurality of the decisions; and
creating outputs for each decision, the outputs affecting which decision point is shown after the associated decision is selected.

24. The method of claim 23, further comprising:
applying one or more labels to one or more of the decision points;
receiving a decision that is not one of the plurality of decisions;
generating new situational awareness outputs based on the received decision;
repeating the sending, outputting and receiving steps based on the new situational awareness output based on a set of road-maps;
filtering one or more of the decision points; and
simulating at least one of the decisions at least one of the decision points,
wherein the decision that is not one of the plurality of decisions is a user-defined decision,
wherein the situational awareness outputs are associated with the simulated emergency by type of emergency, wherein each decision point comprises:
- one or more inputs;
- one or more outputs; and
- one or more choices, wherein the inputs comprise one or more of simulated events (Sim-Events) and pre-requisite decisions, wherein the outputs comprise one or more of simulated requests (Sim-Requests), and wherein the choices correspond to a decision outcome.

\* \* \* \* \*